(12) United States Patent
Kim

(10) Patent No.: US 6,745,561 B2
(45) Date of Patent: Jun. 8, 2004

(54) EXHAUST MANIFOLD FOR VEHICLE

(75) Inventor: Heung-Chul Kim, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/256,793

(22) Filed: Sep. 27, 2002

(65) Prior Publication Data

US 2003/0061807 A1 Apr. 3, 2003

(30) Foreign Application Priority Data

Sep. 28, 2001 (KR) .......................................... 2001-60589

(51) Int. Cl.⁷ ................................................. F01N 7/10
(52) U.S. Cl. ............................ 60/323; 60/305; 60/322
(58) Field of Search .......................... 60/272, 322, 323, 60/299, 305

(56) References Cited

U.S. PATENT DOCUMENTS

| | | | | |
|---|---|---|---|---|
| 5,867,985 A | * | 2/1999 | Furuhashi et al. | 60/323 |
| 5,894,726 A | * | 4/1999 | Monnier | 60/274 |
| 6,009,706 A | * | 1/2000 | Haneda | 60/323 |
| 6,018,946 A | * | 2/2000 | Matsumoto | 60/323 |
| 6,230,490 B1 | * | 5/2001 | Suzuki et al. | 60/323 |
| 6,332,314 B1 | * | 12/2001 | Nakade et al. | 60/299 |
| 6,487,854 B2 | * | 12/2002 | Maus | 60/324 |

* cited by examiner

Primary Examiner—Binh Tran
(74) Attorney, Agent, or Firm—Morgan Lewis & Bockius LLP

(57) ABSTRACT

An exhaust manifold for vehicle is disclosed. First and fourth runners among a plurality of runners connected to cylinders of an engine are respectively connected to sides of a gas confluence part. Second and third runners disposed between the first and fourth runners are joined together integrally before being connected to the gas confluence part.

3 Claims, 2 Drawing Sheets

EXHAUST MANIFOLD FOR VEHICLE

FIELD OF THE INVENTION

The present invention relates to an exhaust manifold for a vehicle and, more particularly, to an exhaust manifold uniformly distributing exhaust gas passing through the catalytic converter and preventing formation of cracks due to thermal stress.

BACKGRNOUND OF THE INVENTION

Generally, the exhaust manifold is the part which collects the exhaust gasses from the respective cylinders of the engine to lead the flow of the collected exhaust gas to an exhaust pipe. In a 4-cylinder engine, usually four runners or pipes are used. In one type, the four runners are directly connected to a gas confluence part that is connected to the catalytic converter and leads to the exhaust pipe and muffler. In another type, the runners are connected in two pairs respectively to the gas confluence part.

The former type (in which the four runners are directly connected) is generally called 4-1 type. In this type first, second, third and fourth runners are connected to a gas confluence part with uniform spacing between the runners at the point they join the confluence part. The gas confluence part is provided with a sensor installation slot for installing an oxygen sensor.

While this type of manifold has a simple structure, the spacing between the runners is narrow where it joins the gas confluence part. As a result, the gas confluence part frequently cracks due to thermal stress, with the result that the overall life of such an exhaust manifold is decreased. An additional drawback exists in that exhaust gas interferences occur between the runners in accordance with the ignition sequence (first cylinder→third cylinder→fourth cylinder→second cylinder).

The second type of manifold (in which the four runners are connected to the gas confluence part in two pairs) is generally called 4-2-1 type. In this type the first and fourth runners are joined together in a Y-shape before being connected to the gas confluence part. Likewise, the second and third runners are joined together in a Y-shape before also being connected to the gas confluence part. As a result, only two passages, i.e., a passage which has been formed by the joining of the first and fourth runners, and another passage which has been formed by the joining of the second and third runners, are connected to the gas confluence part. The gas confluence part is also provided with a sensor installation slot for installing an oxygen sensor.

This 4-2-1 type exhaust manifold has an advantage that the flow of the exhaust gas is more efficient compared with the 4-1 type exhaust manifold. However, in this exhaust manifold, because the first runner and the fourth runner face toward each other, if the length of the first and fourth runners is too short, an exhaust gas interference cannot be avoided in accordance with the igniting sequence (first cylinder→third cylinder→fourth cylinder→second cylinder). As with the 4-1 type exhaust manifold, the spacing between the runners is narrow where they join the confluence part, again resulting in thermal stress cracks.

Further, the 4-2-1 type exhaust manifold is more complicated in its structure compared with the 4-1 type exhaust manifold. Consequently, the manufacture is more difficult and the weight greater

SUMMARY OF THE INVENTION

In an embodiment of the present invention, first and fourth runners of an exhaust manifold are respectively directly connected to a gas confluence part, while second and third runners are joined together before connecting to the gas confluence part. With this arrangement, flow of exhaust gas is more efficient in streaming to the gas confluence part, and exhaust gas interference is prevented in accordance with the igniting sequence (first cylinder→third cylinder→fourth cylinder→second cylinder). Also, spacing between the runners is widened at the gas confluence part so as to reduce or prevent formation of cracks due to thermal stress.

In a further preferred embodiment of the present invention, the cross sectional area of the runners at the connection point to the confluence part is expanded, whereby the flow velocity of the exhaust gas is slowed to more uniformly distribute exhaust gas passing through the catalytic converter so as to improve its performance.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENTS

Figure 1:
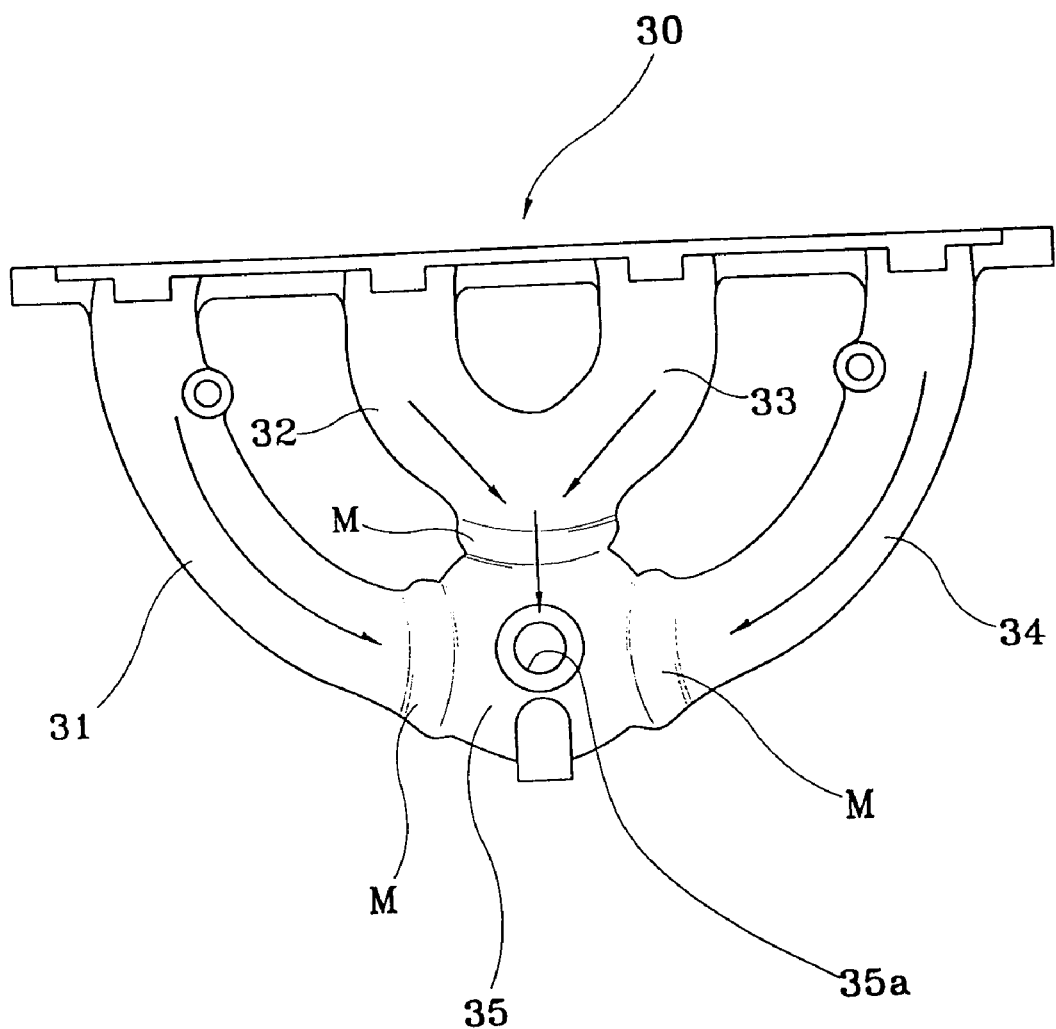
FIG. 1 is a plan view of an exhaust manifold according to an embodiment of the present invention.
Figure 2:
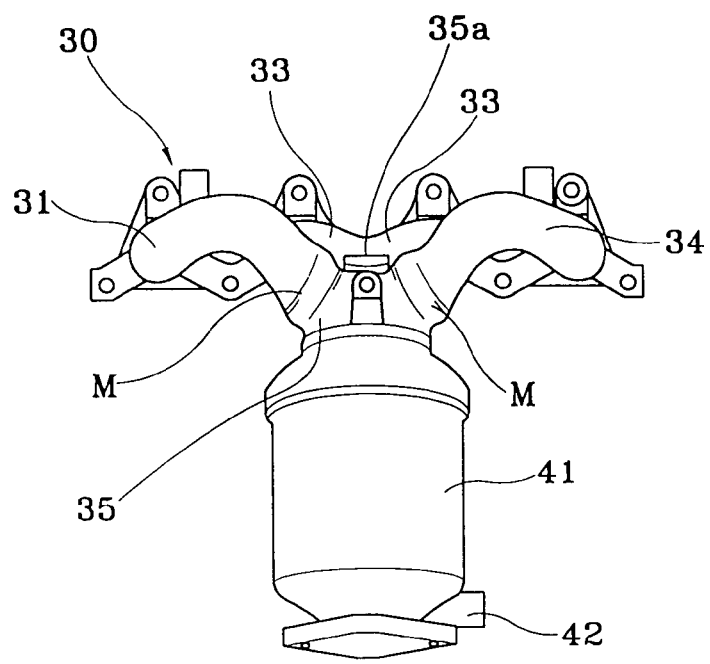
FIGS. 2 and 3 are front and side views showing a catalytic converter coupled to the exhaust manifold according to an embodiment of the present invention.
Figure 3:
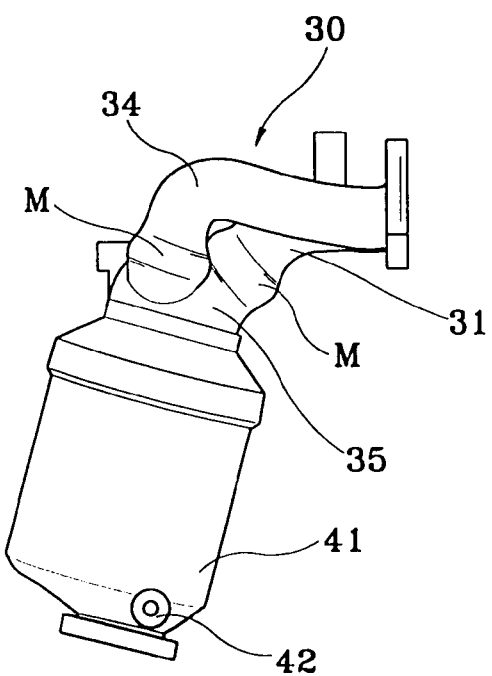

As shown in FIGS. 1 to 3, in an exhaust manifold 30 according to an embodiment of the present invention, first, second, third and fourth runners 31, 32, 33 and 34 are connected to a gas confluence part 35 with uniform spacing. The first runner 31 and the fourth runner 34 are respectively connected to the sides of the gas confluence part 35 with the same inclination angles. The second runner 32 and the third runner 33, which are disposed between the first and fourth runners 31 and 34, are joined together in a Y-shaped form and then the joined part is connected to the gas confluence part 35.

The cross sectional areas of the first, second, third and fourth runners 31, 32, 33 and 34 are constant over their entire length, but at the portion where the runners are connected to the gas confluence part 35, the cross sectional area is expanded. Reference letter M in FIGS. 1 to 3 indicates the expansion point at which the cross sectional areas of the first, second, third and fourth runners 31, 32, 33 and 34 are expanded. A person skilled in the art will recognize that specific sizes may be employed depending on factors such as engine size and performance. Accordingly, exhaust gas velocity is decreased when entering from the first, second, third and fourth runners 31, 32, 33 and 34 into the gas confluence part 35. Therefore, exhaust gas is sufficiently distributed and takes a sufficient time when passing through the catalytic converter 41, thereby improving the gas purifying capability of the catalytic converter 41. The gas confluence part 35 is provided with a sensor installation slot 35a in which an oxygen sensor (not illustrated) is installed.

The gas confluence part 35 is coupled with a catalytic converter 41, FIGS. 2 and 3, which reduces the toxic gases of the exhaustion gas such as carbon monoxide (CO), unstable hydrocarbon (HC) and nitrogen oxides ($NO_x$) to non-toxic gases such as carbon dioxide ($CO_2$), steam ($H_2O$), nitrogen ($N_2$) and oxygen ($O_2$). The catalytic converter 41 is connected to an exhaust pipe 42 which is in turn connected to a muffler.

The first runner 31 and the fourth runner 34 of the exhaust manifold 30 are respectively connected to the sides of the gas confluence part 35 according to the present invention, while the second runner 32 and the third runner 33 of the gas confluence part 30 are joined together in a Y shape at a predetermined position to form a single passage according to the present invention. Thus the exhaust gas efficiently flows in entering into the gas confluence part 35, and exhaust gas interference does not occur in accordance with the ignition sequence (first cylinder→third cylinder→fourth cylinder→second cylinder).

In the exhaust manifold 30 of the present invention, the spacing between the runners 31,32, 33 and 34 is relatively wide at the gas confluence part 35 compared with conventional exhaust manifolds. Accordingly, the formation of cracks due to the thermal stress does not occur on the gas confluence part 35, and therefore, the overall life of the exhaust manifold 30 is improved. Accordingly, the manufacture becomes easy, the workability is improved, and the overall productivity is increased.

According to the present invention as described above, the first and fourth runners of the exhaust manifold are connected respectively to the sides of the gas confluence part, while the second and third runners are joined together in a Y shape before being connected to the gas confluence part. As a result, the exhaust gas enters into the gas confluence part with a smooth flow. Further, exhaust gas interference does not occur in accordance with the ignition sequence (first cylinder→third cylinder→fourth cylinder→second cylinder). Also, cracks due to the thermal stress are not formed on the gas confluence part, and therefore, the overall duration of the exhaust manifold is improved.

What is claimed is:

1. An exhaust manifold for a vehicle, comprising:
   first and fourth runners connected to sides of a gas confluence part, respectively; and
   second and third runners disposed between the first and fourth runners and joined together before being connected to the gas confluence part;
   wherein said runners are configured and dimensioned in symmetry about a line of symmetry divided between the second and third runners;
   wherein cross sectional areas of the first and fourth runners, and the joined together part of the second and third runners are expanded at portions where they are connected to the gas confluence part so as to slow down flow velocities of exhaust gas.

2. The exhaust manifold as claimed in claim 1, wherein the second and third runners are joined together in a Y-shape.

3. An exhaust manifold, comprising:
   a confluence part adapted for connection to a catalytic converter;
   first and fourth runners entering the confluence part on opposite sides adjacent the catalytic converter connection; and
   second and third runners joined in a Y-shape to form a common branch, said common branch entering the confluence part between the first and fourth runners;
   wherein the runners have a first cross-sectional area and the first and fourth runners and said common branch have a second expanded cross-sectional area where entering the confluence part;
   wherein said runners are configured in symmetry about a line of symmetry positioned equidistant between said second and said third runners.

* * * * *